United States Patent
Pannell et al.

(10) Patent No.: US 7,852,768 B1
(45) Date of Patent: *Dec. 14, 2010

(54) PHYSICAL-LAYER DEVICE MANAGEMENT FOR NETWORK SWITCHES

(75) Inventors: Donald Pannell, Cupertino, CA (US); William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 340 days.

This patent is subject to a terminal disclaimer.

(21) Appl. No.: 11/893,424

(22) Filed: Aug. 16, 2007

Related U.S. Application Data

(63) Continuation-in-part of application No. 11/810,667, filed on Jun. 6, 2007.

(60) Provisional application No. 60/815,538, filed on Jun. 21, 2006, provisional application No. 60/823,740, filed on Aug. 28, 2006.

(51) Int. Cl.
*H04L 12/26* (2006.01)

(52) U.S. Cl. ..................................... 370/235

(58) Field of Classification Search ................ None
See application file for complete search history.

(56) References Cited

U.S. PATENT DOCUMENTS

| | | | |
|---|---|---|---|
| 5,826,093 A | 10/1998 | Assouad et al. | |
| 6,636,483 B1 | 10/2003 | Pannell | |
| 6,738,821 B1 | 5/2004 | Wilson et al. | |
| 7,031,341 B2 | 4/2006 | Yu | |
| 7,206,860 B2 | 4/2007 | Murakami et al. | |
| 0,095,083 A1 | 4/2008 | Sorenson et al. | |
| 7,370,135 B2 | 5/2008 | Delano et al. | |
| 7,373,472 B2 | 5/2008 | Bhasin et al. | |
| 7,440,469 B2 | 10/2008 | Oner | |
| 7,548,512 B2 * | 6/2009 | Sexton et al. | 370/235 |
| 2004/0258081 A1 * | 12/2004 | Hayashi | 370/401 |
| 2005/0216584 A1 | 9/2005 | Chisholm | |

(Continued)

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; LAN/MAN Standards Committee of the IEEE Computer Society; Mar. 8, 2002; 578 pages.

(Continued)

*Primary Examiner*—Anh-Vu Ly

(57) ABSTRACT

A request frame for use in managing a physical-layer device (PHY) comprises a preamble; a start frame delimiter for the frame; a destination media access control (MAC) address for the frame, wherein the destination MAC address is stored in the PHY; a source MAC address for the frame; a length/type for the frame, wherein the length/type is stored in the PHY; remote management data comprising one or more commands to be executed by the PHY; and a frame check sequence for the frame. A response frame comprises a preamble; a start frame delimiter for the frame; a destination MAC address for the frame; a source MAC address for the frame; a length/type for the frame, wherein the length/type is stored in the PHY; remote management data comprising a response to a command from a management device having the destination MAC address; and a frame check sequence for the frame.

12 Claims, 13 Drawing Sheets

U.S. PATENT DOCUMENTS

| | | | |
|---|---|---|---|
| 2006/0186973 | A1* | 8/2006 | Satou .................. 333/260 |
| 2007/0127469 | A1 | 6/2007 | Rashid et al. |
| 2008/0114887 | A1 | 5/2008 | Bryers et al. |

OTHER PUBLICATIONS

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; Section Three: This section includes Clauses 34 through 43 and Annexes 36A through 43C; LAN/MAN Standards Committee of the IEEE Computer Society; Mar. 8, 2002; 379 pages.

* cited by examiner

| Octet | b7 ... b0 |
|---|---|
| Octet 0 | 00111 \| M \| PHYAD[4:3] |
| Octet 1 | PHYAD[2:0] \| DEVAD [4:0] |
| Octet 2 | REGAD [7:0] — Starting REGAD |
| Octet 3 | REGAD [15:8] |
| Octet 4 | Pattern [7:0] — Pattern To Match |
| Octet 5 | Pattern [15:8] |
| Octet 6 | Mask [7:0] — 0 = Match Bit, 1 = Ignore Bit |
| Octet 7 | Mask [15:8] |
| Octet 8 | Timeout [7:0] — Number Of Units Of Delay |
| Octet 9 | Timeout [15:8] |
| Octet 10 | 000000 \| U[1:0] — U[1:0] - 00 = microseconds, 01 = milliseconds, 10 = seconds, 11 = no timeout |
| Octet 11 | 00000000 |

1004

| Octet | b7 ... b0 |
|---|---|
| Octet 0 | 00111 \| 0 \| PHYAD[4:3] |
| Octet 1 | PHYAD[2:0] \| DEVAD [4:0] |
| Octet 2 | REGAD [7:0] — Starting REGAD |
| Octet 3 | REGAD [15:8] |
| Octet 4 | Pattern [7:0] — Echo Value In Request Field |
| Octet 5 | Pattern [15:8] |
| Octet 6 | Mask [7:0] — Echo Value In Request Field |
| Octet 7 | Mask [15:8] |
| Octet 8 | Timeout [7:0] — Echo Value In Request Field |
| Octet 9 | Timeout [15:8] |
| Octet 10 | 000000 \| U[1:0] — Echo Value In Request Field |
| Octet 11 | 0000000 \| M — M - 0 = Pattern Matched, 1 = Timeout |

*FIG. 10*

PHYSICAL-LAYER DEVICE MANAGEMENT FOR NETWORK SWITCHES

CROSS-REFERENCE TO RELATED APPLICATIONS

This application is a continuation-in-part of U.S. Non-Provisional patent application Ser. No. 11/810,667 filed Jun. 6, 2007, which claims the benefit of U.S. Provisional Patent Application Ser. No. 60/815,538 filed Jun. 21, 2006, the disclosures thereof incorporated by reference herein in their entirety.

This application claims the benefit of U.S. Provisional Patent Application Ser. No. 60/823,740 filed Aug. 28, 2006, the disclosure thereof incorporated by reference herein in its entirety.

BACKGROUND

The present invention relates generally to data communications. More particularly, the present invention relates to physical-layer device management for network switches.

It is often desirable to manage a network switch remotely, that is, from a location other than the location of the network switch, generally by reading and writing memories, such as configuration registers and memories storing address and management information databases, in the network switch.

Conventional techniques for remote management of network switches include implementing a unit that includes a central processing unit (CPU) connected to the network switch. Management frames are sent to the CPU, which manages the network switch. One disadvantage of this approach is the cost of the CPU, especially when the location of the network switch, for example outside a customer's home, requires the CPU and any associated components to be implemented according to industrial temperature standards.

Once the CPU receives management frames, the CPU reads and writes registers and memory inside the attached network switch device using a local interface. One conventional technique for this 'CPU to register' access is a high speed bus interface like PCI (Peripheral Component Interconnect). One disadvantage of this approach is the cost of the device pins associated with such buses.

One conventional technique to save pins for the local interface of network switches employs an existing serial interface such as the System Management Interface (SMI) to manage the network switch. SMI requires only two pins that can be shared between many devices, but has comparatively slow performance. However, as the performance and complexity of current network switches has grown, so have the switch databases, which are now so large that the SMI interface is now considered too slow to transfer such large amounts of data. For example, to read an 8 k entry address database over an SMI interface may require approximately 25 seconds depending upon the design. Furthermore, customers are reading management information frequently, for example to determine utilization rates.

SUMMARY

In general, in one aspect, the invention features a frame for use in managing a physical-layer device (PHY), the frame comprising: a preamble; a start frame delimiter for the frame; a destination media access control (MAC) address for the frame, wherein the destination MAC address is stored in the PHY; a source MAC address for the frame; a length/type for the frame, wherein the length/type is stored in the PHY; remote management data comprising one or more commands to be executed by the PHY; and a frame check sequence for the frame.

In some embodiments, the remote management data further comprises: a sequence number for the frame. In some embodiments, the remote management data further comprises: a request format for the frame, wherein the request format is stored in the PHY. In some embodiments, the frame is otherwise compliant with IEEE standard 802.3. In some embodiments, one of the commands comprises: a delay value, wherein the PHY waits for an interval specified by the delay value before executing a subsequent command. In some embodiments, one of the commands comprises: a register address for a register in the PHY; and a pattern, wherein the PHY waits until a value in the register matches the pattern before executing a subsequent command. In some embodiments, one of the commands further comprises: a delay value, wherein the PHY ceases to wait after an interval specified by the delay value. In some embodiments, one of the commands comprises: a message command to cause the PHY to send a response describing status of an operation specified by the message command.

In general, in one aspect, the invention features a frame for use in managing a physical-layer device (PHY), the frame comprising: a preamble; a start frame delimiter for the frame; a destination media access control (MAC) address for the frame; a source MAC address for the frame; a length/type for the frame, wherein the length/type is stored in the PHY; remote management data comprising a response to a command from a management device having the destination MAC address; and a frame check sequence for the frame.

In some embodiments, the remote management data further comprises: a sequence number for the frame. In some embodiments, the remote management data further comprises: a request format for the frame, wherein the request format is stored in the PHY. In some embodiments, the frame is otherwise compliant with IEEE standard 802.3.

The details of one or more implementations are set forth in the accompanying drawings and the description below. Other features will be apparent from the description and drawings, and from the claims.

DESCRIPTION OF DRAWINGS

FIG. 9 shows a request format and a response format for a delay command according to some embodiments of the present invention.

FIG. 10 shows a request format and a response format for a wait on pattern match command according to some embodiments of the present invention.

FIG. 11 shows a request format and a response format for a message command according to some embodiments of the present invention.

Figure 1:
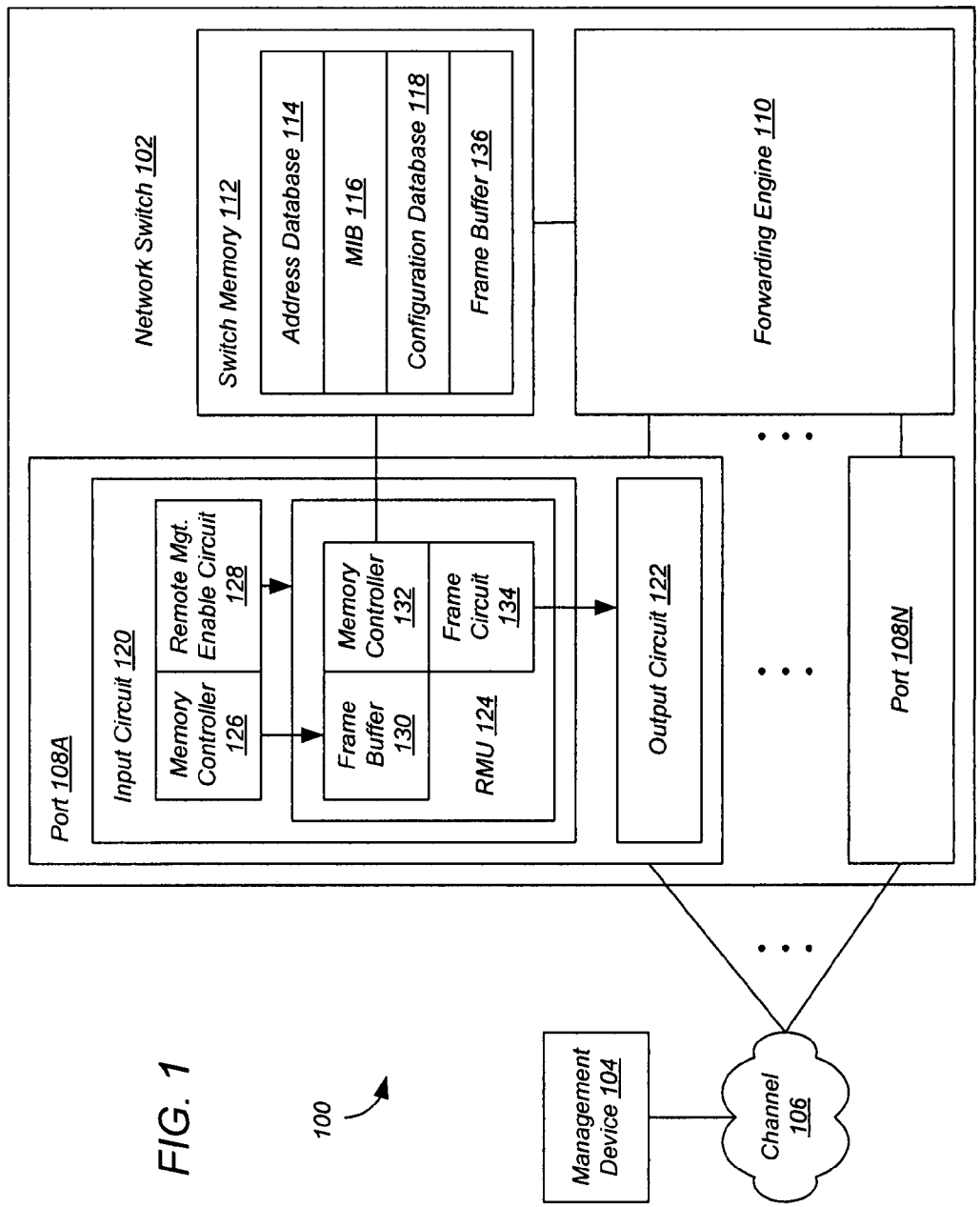
FIG. 1 shows a remote management system for a network switch according to a preferred embodiment of the present invention.

The leading digit(s) of each reference numeral used in this specification indicates the number of the drawing in which the reference numeral first appears.

DETAILED DESCRIPTION

Some embodiments of the present invention provide physical-layer device (PHY) management for network switches using layer-2 frames such as Ethernet frames and the like. Request frames comprising commands to read and/or write registers in a PHY can be generated by a management device, such as a CPU and the like, that is implemented remotely or locally. Response frames generated by the PHY, either in response to request frames or local stimuli, such as interrupts and the like, can be directed to the management device.

Some embodiments of the present invention provide remote management for network switches, thereby enabling an administrator at one location to manage a network switch at another location over a network or to manage a local network switch device. In some embodiments, frames such as Ethernet frames are used to access memories within the switch, for example to perform such management functions as altering the switch configuration, reading the management information base (MIB), and reading and writing the address database, without the need of a central processing unit (CPU). In other embodiments, the local CPU inside a network switch can manage the local devices with higher performance while at the same time saving device pins. Embodiments of the present invention thus provide a solution to the local interface performance vs. pin cost problem by utilizing the existing frame interface between the CPU and the switch device. This approach can be used to eliminate the CPU and any associated components from a physically remote network switch, for example outside a customer's home.

FIG. 1 shows a remote management system 100 for a network switch 102 according to a preferred embodiment of the present invention. Remote management system 100 comprises network switch 102 in communication with a management device 104 over a channel 106. Network switch 102 can be implemented as one or more integrated circuits. Management device 104 can be implemented as a personal computer, workstation, CPU, or the like.

In some embodiments, channel 106 is implemented as a layer-2 network, for example in a remote management configuration where management device 104 is remote from network switch 102. In other embodiments, channel 106 can be implemented as a direct link, for example in a configuration where management device 104 is implemented as a CPU connected directly to network switch 102.

Network switch 102 comprises a plurality of ports 108A-N in communication with a forwarding engine 110. Network switch 102 also comprises a switch memory 112 to store an address database 114, a management information base (MIB) 116, a configuration database 118, and a frame buffer 136. Switch memory 112 can be implemented as one or more memories, which can be of different types such as random-access memory, registers, and the like. For example, switch memory 112 can include registers deployed in input circuits 120, output circuits 122, forwarding engine 110, other local and global registers, and the like.

Each port 108A-N comprises a respective input circuit 120 and a respective output circuit 122. Each port 108 can be implemented as a remote management port according to preferred embodiments of the present invention. However, for clarity of explanation, only one port 108A of network switch 102 is implemented as a remote management port.

In some embodiments, only one or more designated ports 108 are implemented as remote management ports. For example, in a network access box deployed at a customer's home, the customer port is not implemented as a remote management port to prevent the customer from controlling the network access switch.

Input circuit 120 of remote management port 108A comprises a remote management unit (RMU) 124, a memory controller 126, and a remote management enable circuit 128. Remote management unit 124 comprises a remote management frame buffer 130, a memory controller 132, and a frame circuit 134. Remote management frame buffer 130 is preferably implemented as a 512 kB static random-access memory, although other memory sizes and types can be used. As shown in FIG. 1, remote management frame buffer 130 and frame buffer 136 are preferably implemented separately. This arrangement permits remote management unit 124 to function even if there is a problem with network switch 102.

Figure 2:
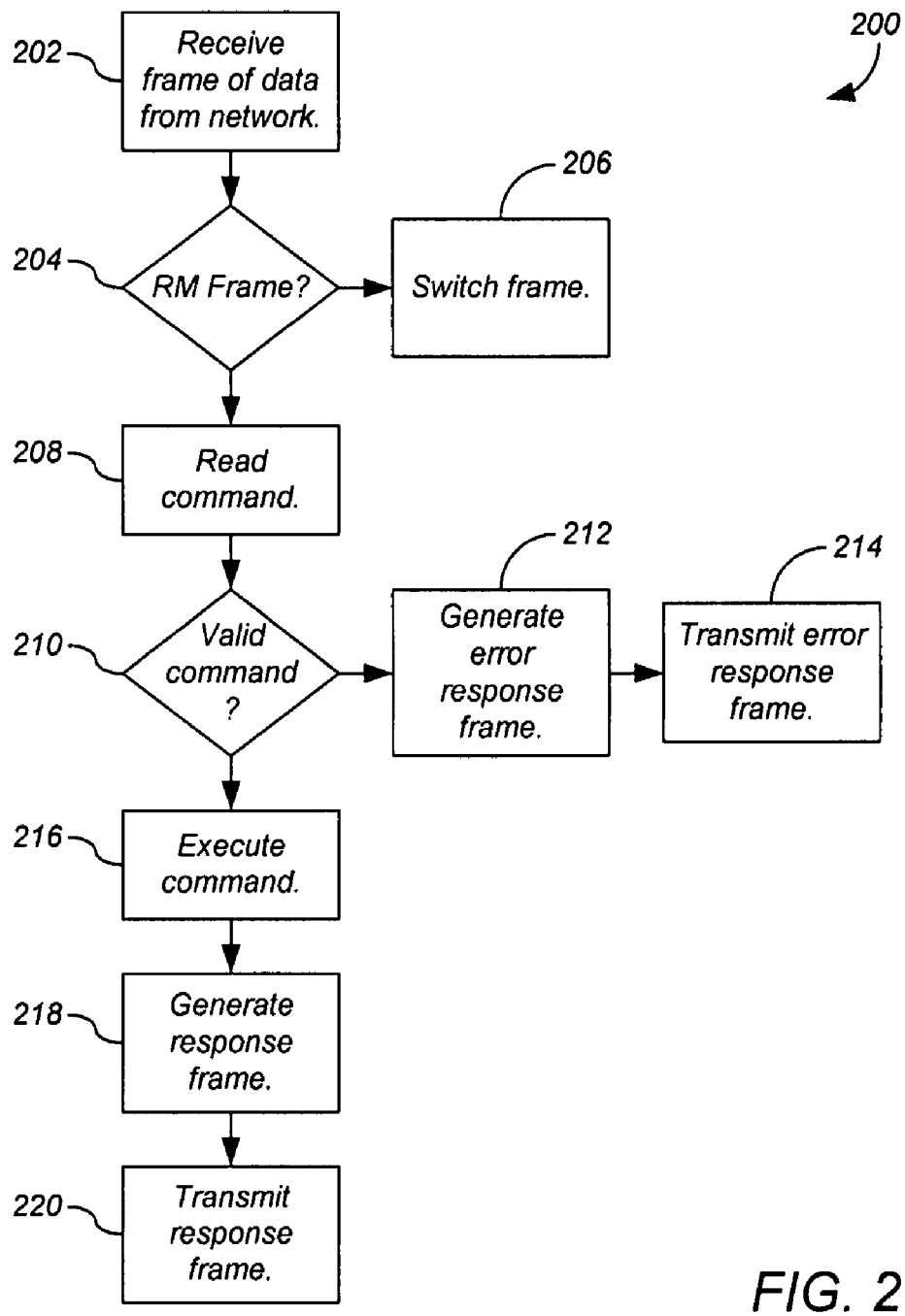
FIG. 2 shows a process for the network switch of FIG. 1 according to a preferred embodiment of the present invention.

FIG. 2 shows a process 200 for network switch 102 of FIG. 1 according to a preferred embodiment of the present invention. Input circuit 120 of remote management port 108A receives a frame of data from channel 106 (step 202). Preferably input circuit 120 of remote management port 108A writes each received frame of data to remote management unit 124. In particular, memory controller 126 of input circuit 120 writes the frame of data to remote management frame buffer 130 of remote management unit 124.

Input circuit 120 then determines whether the frame is a remote management frame (step 204). Preferably each remote management frame comprises a remote management flag or some other unique identifier that, when set, identifies the frame as a remote management frame. Remote management enable circuit 128 tests the remote management flag.

When the frame is not a remote management frame, network switch 102 switches the frame according to conventional techniques (step 206). In particular, forwarding engine 110 passes the frame to one or more of ports 108 selected according to address database 114 stored in switch memory 112. Output circuit(s) 122 of the selected ports(s) 108 then transmit the frame from network switch 102.

When the frame is a remote management frame, remote management unit 124 processes the frame. In particular, remote management enable circuit 128 tests the remote management flag, and when the remote management flag is set, enables remote management unit 124.

Each remote management frame comprises a command, for example, read, write, destructive read (in other words, read and clear), and the like. When enabled, remote management unit 124 reads the command from remote management frame buffer 130 (step 208) and validates the command (step 210). If the command is invalid (for example, the command does not conform to a known command, attempts to access an illegal memory location or register, and the like), frame circuit 134 generates an error response frame addressed to the sender of the invalid remote management frame (step 212).

Network switch 102 then transmits the error response frame (step 214). Preferably each remote management frame comprises a sequence number established by the sender. Remote management unit 124 preferably includes the sequence number in the corresponding response frame to enable the sender to match the response frame with the corresponding remote management frame.

However, if the command in the remote management frame is valid, remote management unit 124 executes the command (step 216). If the command is a write command, memory controller 132 of remote management unit 124 transfers data specified by the remote management frame to the location in switch memory 112 specified by the remote management frame. Write commands can be used, for example, to alter switch information governing the operation of network switch 102 such as address database 114 and configuration database 118.

Preferably remote management unit 124 generates a response frame for each remote management frame in order to provide feedback to the sender. In these embodiments, frame circuit 134 generates the response frame addressed to the sender of the remote management frame (step 218), which network switch 102 then transmits (step 220). Preferably the response frame includes the sequence number of the remote management frame.

If the command is a read command, memory controller 132 of remote management unit 124 reads data from the location in switch memory 112 specified by the remote management frame. Read commands can be used, for example, to read address database 114, MIB 116, and configuration database 118. The read commands can be destructive, in which case memory controller 132 also clears the specified locations in switch memory 112. Frame circuit 134 generates a response frame addressed to the sender of the remote management frame and comprising the requested data (step 218), which network switch 102 then transmits (step 220). Preferably the response frame includes the sequence number of the remote management frame.

Figure 3:
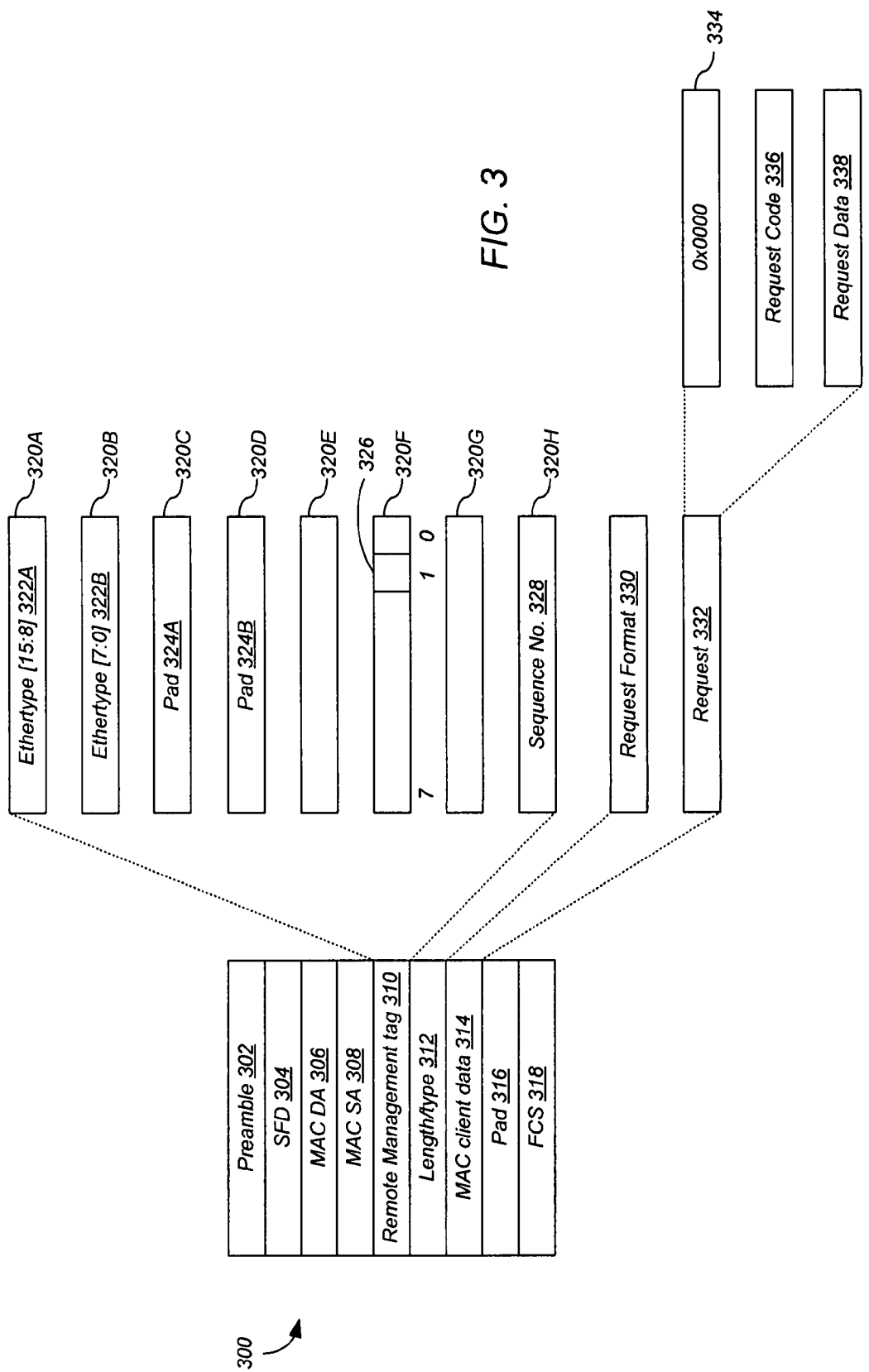
FIG. 3 shows the format of a request frame according to a preferred embodiment of the present invention.

FIG. 3 shows the format of a request frame 300 according to a preferred embodiment of the present invention. For example, request frame 300 can be used as described above to transmit remote management information from management device 104 to network switch 102.

Frame 300 comprises a 7-octet preamble 302, a 1-octet start frame delimiter (SFD) 304, a 6-octet MAC destination address (DA) 306, a 6-octet MAC source address (SA) 308, a 4-octet remote management tag 310, a 2-octet length/type 312, MAC client data 314, a variable-size pad 316, and a frame check sequence (FCS) 318. Of course the fields of frame 300 can have different lengths and occur in different sequences than described, as will be apparent to one skilled in the relevant arts after reading this description.

Remote management tag 310 preferably comprises eight octets 320A-H, although other tag sizes are contemplated. Octets 320A and 320B preferably comprise an Ethertype value. When remote management frame 300 is used in a layer-2 network, the Ethertype value can be used to cause layer-2 switches to simply forward the frame 300 instead of attempting to process remote management tag 310, thereby ensuring that frame 300 reaches its destination intact. When management device 104 has a direct link to network switch 102, for example when management device 104 and network switch 102 are implemented within the same box, octets 320A-D are optional because the frame will not be passing through a layer-2 network.

Bit 1 of octet 320F comprises a remote management flag 326 that can be used as described above to indicate that frame 300 is a remote management frame. Of course other bits, or combinations of bits, in octets 320A-G can be used to indicate frame 300 is a remote management frame, as will be apparent to one skilled in the relevant arts based on the disclosure and teachings provided herein. Octet 320H comprises a sequence number 328, which can be used as described above to match requests and responses.

MAC client data 314 preferably comprises a 2-octet request format 330 that can be used to identify a device type of the recipient network switch 102, and a variable-length request 332, which comprises two octets 334 set to 0x0000, a 2-octet request code 336 comprising one or more commands, and variable-length request data 338 such as data to be written to switch memory 112.

Figure 4:
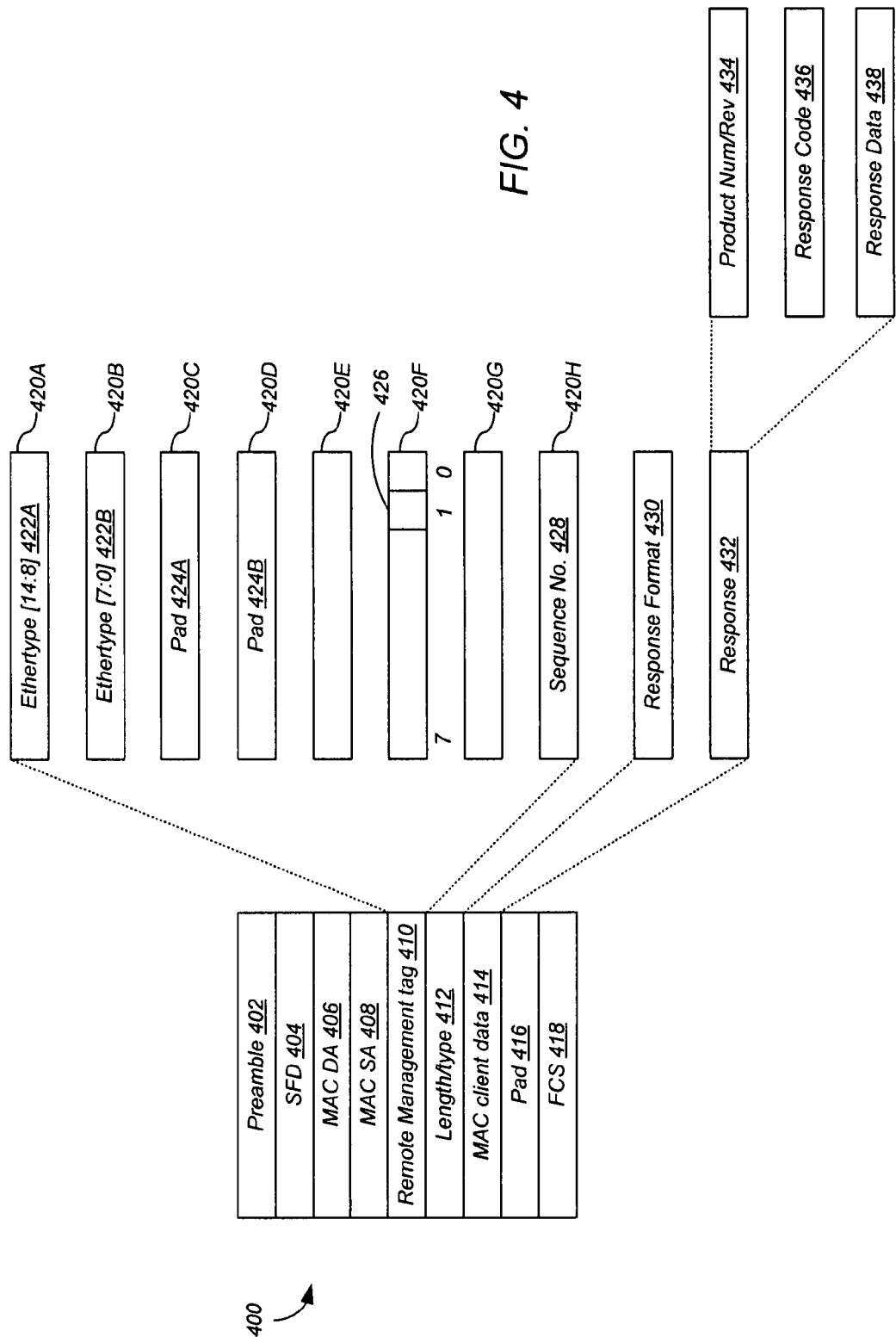
FIG. 4 shows the format of a response frame according to a preferred embodiment of the present invention.

FIG. 4 shows the format of a response frame 400 according to a preferred embodiment of the present invention. For example, response frame 400 can be used as described above to transmit remote management information from network switch 102 to management device 104.

Frame 400 comprises a 7-octet preamble 402, a 1-octet start frame delimiter (SFD) 404, a 6-octet MAC destination address (DA) 406, a 6-octet MAC source address (SA) 408, a 4-octet remote management tag 410, a 2-octet length/type 412, MAC client data 414, a variable-size pad 416, and a frame check sequence (FCS) 418. Of course the fields of frame 400 can have different lengths and occur in different sequences than described, as will be apparent to one skilled in the relevant arts after reading this description.

Remote management tag 410 preferably comprises eight octets 420A-H, although other tag sizes are contemplated. Octets 420A and 420B preferably comprise an Ethertype value. When remote management frame 400 is used in a layer-2 network, the Ethertype value can be used to cause layer-2 switches to simply forward the frame 400 instead of attempting to process remote management tag 410, thereby ensuring that frame 400 reaches its destination intact.

Bit 1 of octet 420F comprises a remote management flag 426 that can be used as described above to indicate that frame 400 is a remote management frame. Octet 420H comprises a sequence number 428, which can be used as described above to match requests and responses.

MAC client data 414 preferably comprises a 2-octet response format 430 that can be used to identify a device type of the sending network switch 102 and a variable-length response 432, which comprises a 2-octet Product Num/Rev 434 indicating the product number and revision of the device transmitting frame 400, a 2-octet response code 436, and variable-length response data 438 such as data read from switch memory 112.

In some embodiments, a single request frame 300 can provoke multiple response frames 400, for example to dump an address translation unit (ATU), and the like. For example, a 512-byte response frame 400 can include 48 ATU entries. With an ATU containing 1 k to 16 k entries, it is clear that many frames are needed to dump the full contents of the ATU. In these embodiments it is preferable to limit the rate and maximum number of response frames 400 as a CPU may not have enough memory or bandwidth to accept the full contents of the ATU at one time.

In some embodiments, remote management unit 124 can generate a response frame 400 without previously receiving a corresponding request frame 300, for example as the direct result of some action that needs to be serviced inside the device, such as servicing an interrupt and the like.

Figure 5:
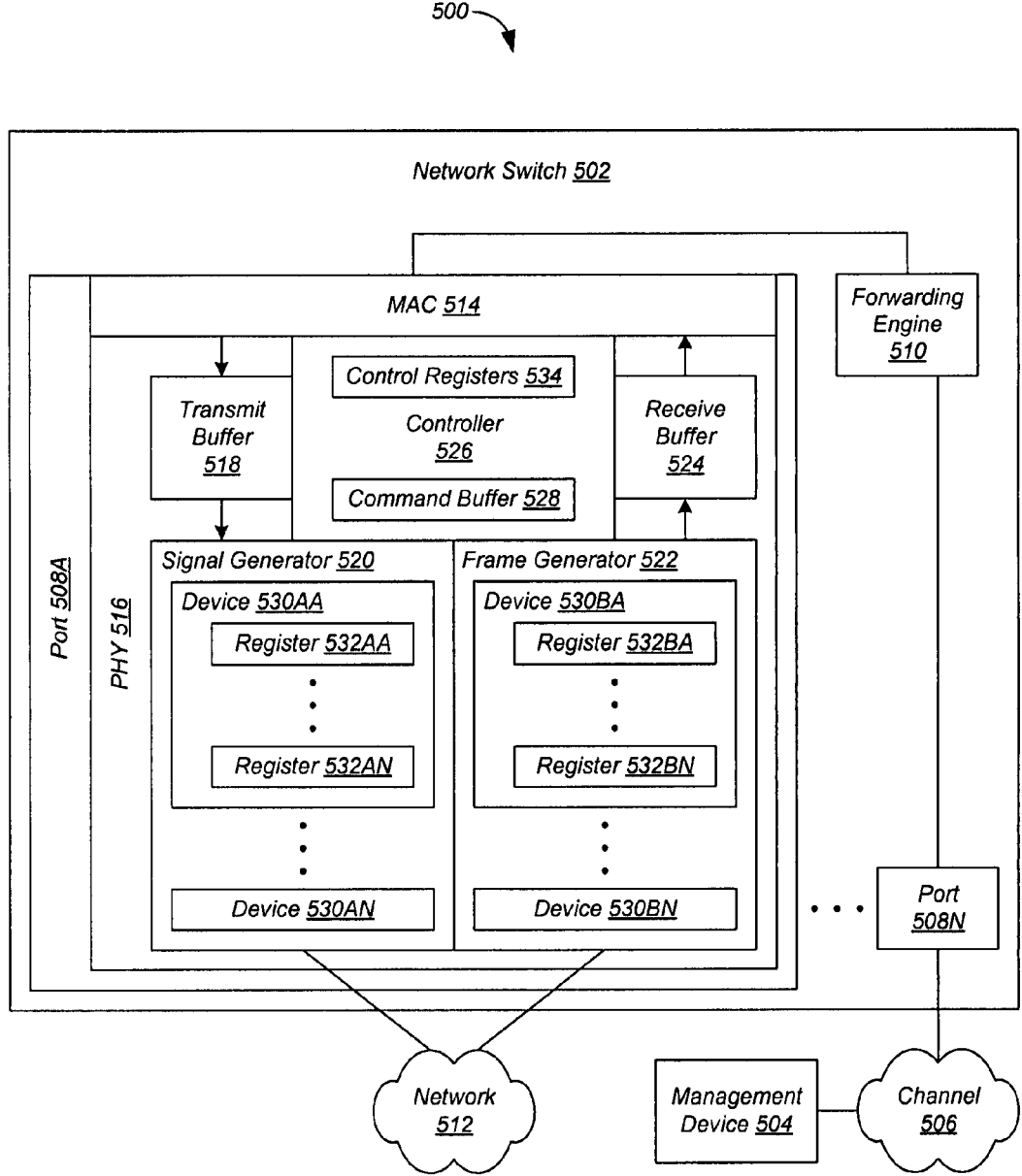
FIG. 5 shows a remote management system for a physical-layer device (PHY) of a network switch according to a preferred embodiment of the present invention.

FIG. 5 shows a remote management system 500 for a physical-layer device (PHY) 516 of a network switch 502 according to a preferred embodiment of the present invention. Remote management system 500 comprises network switch 502 in communication with a management device 504 over a channel 506, and in communication with a network 512 such as a layer-2 network or the like. Network switch 502 can be implemented as one or more integrated circuits. Management device 504 can be implemented as a personal computer, workstation, CPU, or the like.

In some embodiments, channel 506 is implemented as a layer-2 network, for example in a remote management configuration where management device 504 is remote from network switch 502. In these embodiments, channel 506 and network 512 can be the same network or different networks. In other embodiments, channel 506 can be implemented as a direct link, for example in a configuration where management device 504 is implemented as a CPU connected directly to network switch 502.

Network switch 502 comprises a plurality of ports 508A-N in communication with a forwarding engine 510. Each port 508A-N comprises a media access controller (MAC) 514 and a PHY 516. Each port 508 can be implemented as a remote management port according to preferred embodiments of the present invention. However, for clarity of explanation, only one port 508A of network switch 502 is implemented as a remote management port.

In some embodiments, only one or more designated ports 508 are implemented as remote management ports. For example, in a network access box deployed at a customer's home, the customer port is not implemented as a remote management port to prevent the customer from controlling the network access switch.

PHY 516 of remote management port 508A includes a transmit buffer 518 and a receive buffer 524 to buffer frames received from, and destined for, MAC 514, respectively. Buffers 518 and 524 can be implemented as first-in first-out (FIFO) buffers. PHY 516 also includes a signal generator 520 to transmit signals to network 512, the signals representing frames of data received from transmit buffer 518, and a frame generator 522 to generate frames of data based on signals received from network 512, and to transmit those frames of data to receive buffer 524.

Each of signal generator 520 and frame generator 522 include one or more devices 530. One or more of devices 530 include one or more registers 532. For example, referring to FIG. 5, signal generator 520 includes devices 530AA-530AN, and device 530AA includes registers 532AA-532AN, and frame generator 522 includes devices 530BA-530BN, and device 530BA includes registers 532BA-532BN.

PHY 516 also includes a controller 526 that includes a command buffer 528 and control registers 534. Controller 526 examines the frames buffered in transmit buffer 518 to identify remote management frames, for example by comparing values in predetermined fields of the frames to values stored in control registers 534. Controller 526 transfers remote management frames from transmit buffer 518 to command buffer 528, and executes the commands in the remote management frames with respect to registers 532, for example by writing data to registers 532, reading data from registers 532, and the like. In some embodiments, controller 526 also generates response data and causes frame generator 522 to generate frames of data comprising the response data.

Figure 6:
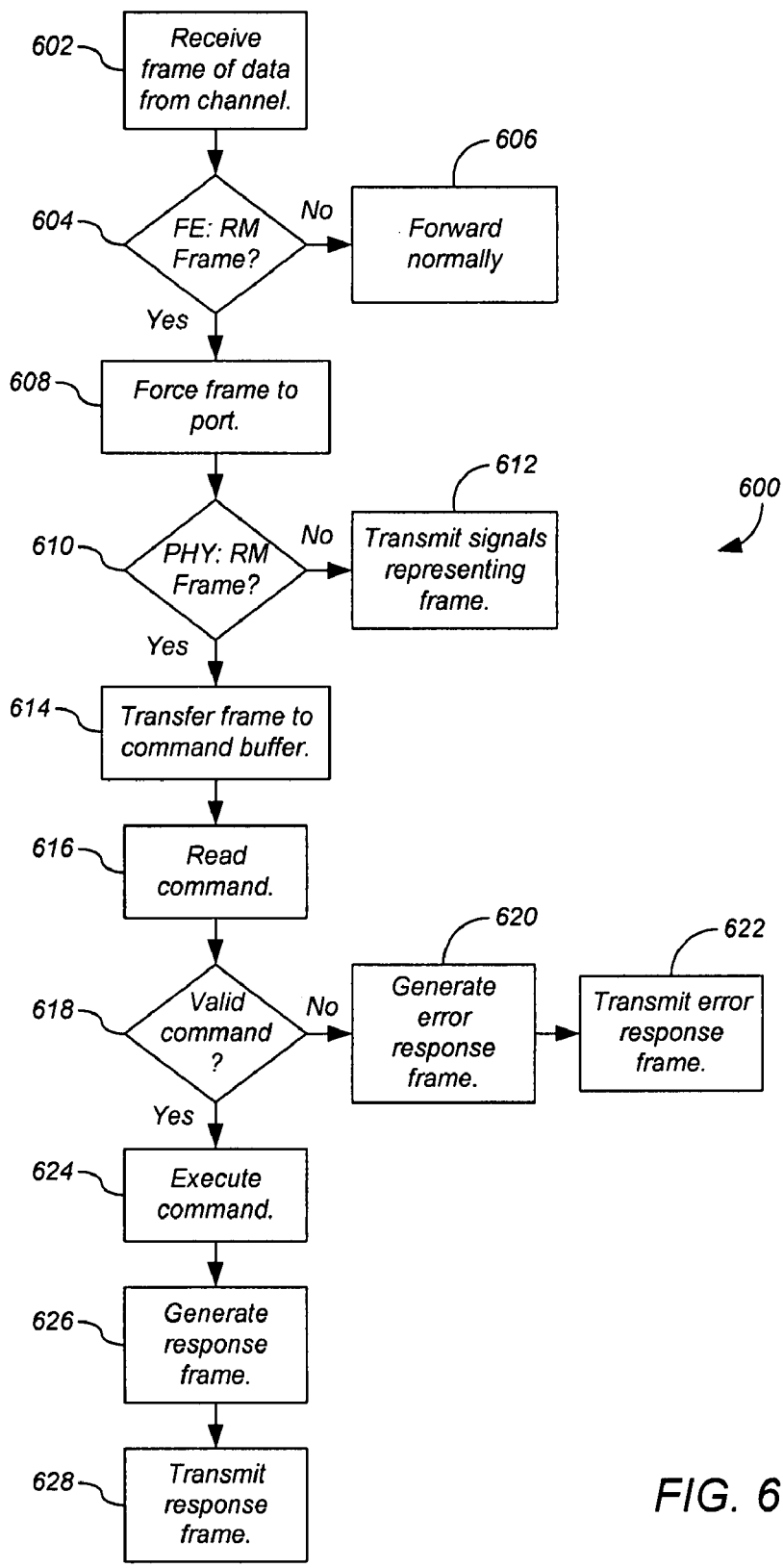
FIG. 6 shows a process for the network switch of FIG. 5 according to a preferred embodiment of the present invention.

FIG. 6 shows a process 600 for network switch 502 of FIG. 5 according to a preferred embodiment of the present invention. Port 508N receives a frame of data from channel 506 (step 602). Forwarding engine (FE) 510 determines whether the frame is a remote management frame (step 604). When the frame is not a remote management frame, forwarding engine 510 forwards the frame normally (step 606). When the frame is a remote management frame, forwarding engine 510 forces the frame to the port designated by the remote management frame (step 608). For example, the designated port can be identified in a header, trailer or tag added to the remote management frame. Several conventional techniques exist for forcing the remote management frame to the proper port, such as spanning tree techniques specified by IEEE standard 802.1D and the like. Referring to the example of FIG. 5, forwarding engine 510 forces remote management frames to remote management port 508A.

MAC 514 of port 508A passes frames received from forwarding engine 510 to transmit buffer 518 of PHY 516. Controller 526 of PHY 516 examines each frame in transmit buffer 518 to determine whether the frame is a remote management frame (step 610). Each remote management frame comprises one or more identifiers that, when having a predetermined value, identify the frame as a remote management frame, for example as described in detail below. The predetermined values can be stored in control buffer 528 of controller 526.

When the frame is not a remote management frame, controller 526 leaves the frame in transmit buffer 518. Signal generator 520 then transmits signals representing the frame to network 512 (step 612). But when the frame is a remote management frame, controller 526 transfers the frame to command buffer 528 (step 614) and processes the frame.

Each remote management frame comprises a command, for example, read, write, destructive read (in other words, read and clear), and the like. Controller 526 reads the command from command buffer 528 (step 616) and validates the command (step 618). If the command is invalid (for example, the command does not conform to a known command, attempts to access an illegal register, and the like), controller 526 causes frame generator 522 to generates an error response frame addressed to the sender of the invalid remote management frame (step 620).

Network switch 502 then transmits the error response frame (step 622). Preferably each remote management frame comprises a sequence number established by the sender. Controller 526 preferably includes the sequence number in the corresponding response frame to enable the sender to match the response frame with the corresponding remote management frame.

However, if the command in the remote management frame is valid, controller 526 executes the command (step 624). If the command is a write command, memory controller 526 transfers data specified by the remote management frame to the register(s) 532 specified by the remote management frame.

Preferably controller 526 generates a response frame for each remote management frame in order to provide feedback to the sender. In these embodiments, frame generator 522 generates the response frame addressed to the sender of the remote management frame (step 626), which network switch 502 then transmits (step 628). Preferably the response frame includes the sequence number of the remote management frame.

If the command is a read command, controller 526 reads data from the register(s) 532 specified by the remote management frame. The read commands can be destructive, in which case controller 526 also clears the specified register(s) 532. Frame generator 522 generates a response frame addressed to the sender of the remote management frame and comprising the requested data (step 626), which network switch 502 then transmits (step 628). Preferably the response frame includes the sequence number of the remote management frame.

Figure 7:
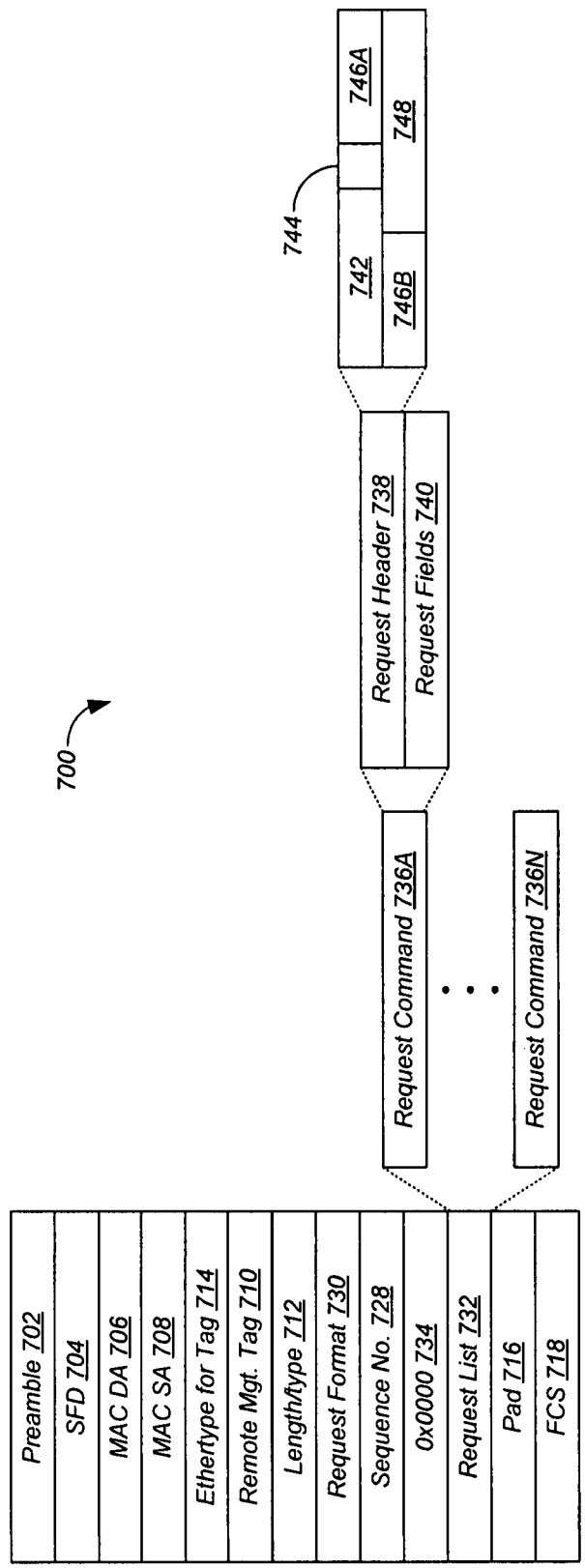
FIG. 7 shows the format of a request frame according to a preferred embodiment of the present invention.

FIG. 7 shows the format of a request frame 700 according to a preferred embodiment of the present invention. For example, request frame 700 can be used as described above to transmit remote management information from management device 504 to network switch 502.

Frame 700 includes a 7-octet preamble 702, a 1-octet start frame delimiter (SFD) 704, a 6-octet MAC destination address (DA) 706, a 6-octet MAC source address (SA) 708, a 2-octet length/type 712, a 2-octet request format 730 that can be used to identify a device type of the recipient network switch 502, a sequence number 728, two octets 734 set to 0x0000, a variable-length request list 732, a variable-size pad 716, and a frame check sequence (FCS) 718. Of course the fields of frame 700 can have different lengths and occur in different sequences than described, as will be apparent to one skilled in the relevant arts after reading this description.

Frame 700 can include a 4-octet remote management tag 710 and an Ethertype 714 for remote management tag 710. When remote management frame 700 is used in a layer-2 network, the Ethertype value can be used to cause layer-2 switches to simply forward the frame 700 instead of attempting to process remote management tag 710, thereby ensuring that frame 700 reaches its destination intact. When management device 504 has a direct link to network switch 502, for example when management device 504 and network switch 502 are implemented within the same box, remote management tag 710 and Ethertype 714 are optional because the frame will not be passing through a layer-2 network.

In some embodiments, PHY 516 compares the values of certain predetermined fields of frame 700 to values stored in control register 534 to determine whether frame 700 is a remote management frame. For example, when MAC DA 706 and length/type 712 match values stored in control register 534, and the value of request format 730 is 0x1000, PHY 516 determines that frame 700 is a remote management frame. Of course other fields, or combinations of fields, can be used to indicate frame 700 is a remote management frame, as will be apparent to one skilled in the relevant arts based on the disclosure and teachings provided herein. In some embodiments, a remote management frame is used to set the values in control register 534.

Request list 732 includes one or more request commands 736A-N, each including a request header 738 and request fields 740. Request header 738 includes an opcode 742, a multicast flag 744, a PHY address 746A,B, and a device address 748.

Figure 8:
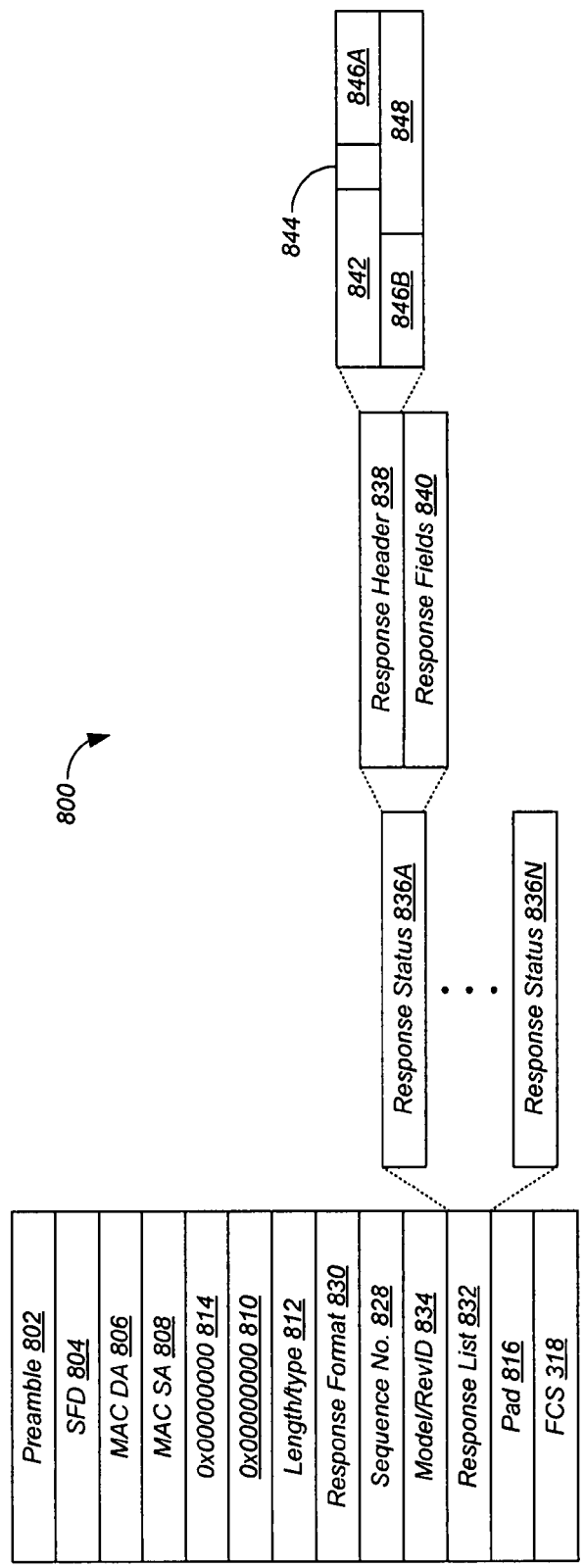
FIG. 8 shows the format of a request frame according to a preferred embodiment of the present invention.

FIG. 8 shows the format of a response frame 800 according to a preferred embodiment of the present invention. For example, response frame 800 can be used as described above to transmit remote management information from network switch 502 to management device 504.

Frame 800 includes a 7-octet preamble 802, a 1-octet start frame delimiter (SFD) 804, a 6-octet MAC destination address (DA) 806, a 6-octet MAC source address (SA) 808, a 2-octet length/type 812, a 2-octet response format 830 that can be used to identify a device type of network switch 502, a sequence number 828, a model/revID 834, a variable-length response list 832, a variable-size pad 816, and a frame check sequence (FCS) 818. Of course the fields of frame 800 can have different lengths and occur in different sequences than described, as will be apparent to one skilled in the relevant arts after reading this description. For example, frame 800 can include two 2-octet pads 810 and 814.

Response list 832 includes one or more response status fields 836A-N, each including a response header 838 and response fields 840. Response header 838 includes an opcode 842, a reserved bit 844, a PHY address 846A,B, and a device address 848.

Now request and response formats are described. Table 1 shows valid request and response opcodes according to some embodiments of the present invention.

TABLE 1

| Request/Response | Description |
| --- | --- |
| 00000 | Register Write |
| 00001 | Register Read |
| 00010 | Multiple Register Write |
| 00011 | Multiple Register Read |
| 00100 | Processor Instruction Write |
| 00101 | Processor Instruction Read |
| 00110 | Delay |
| 00111 | Wait on pattern match |
| 11110 | Messaging |
| 11111 | End of List |

Figures 9, 11:
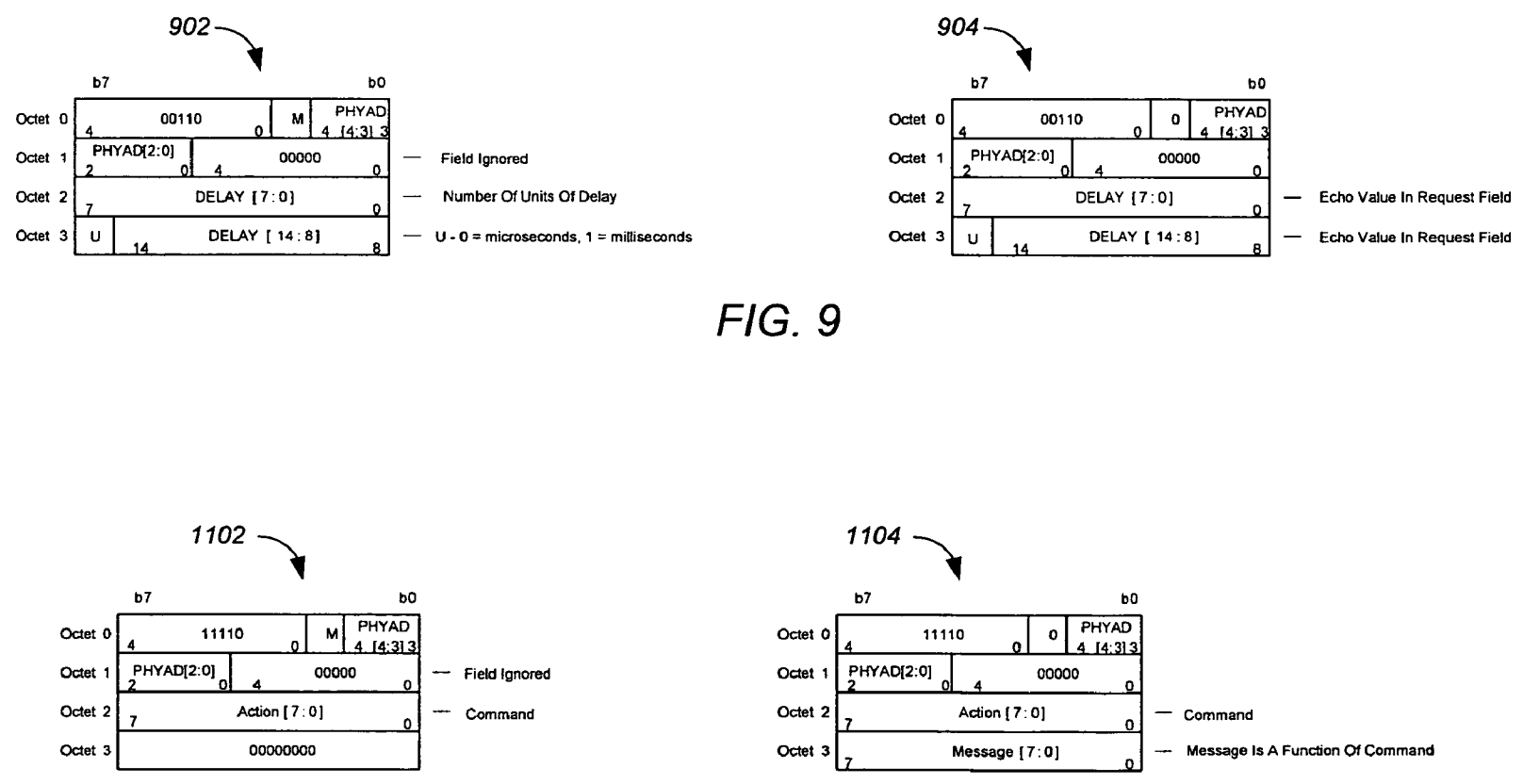

FIGS. 9-11 show request and response formats according to some embodiments of the present invention. With the exception of the message request command used for error handling, every request command in the request list generates the corresponding response status in the response list, assuming matches occur for the PHY address 746 (PHYAD[4:0]) and device address 748 (DEVAD[4:0]). Response status 836 is ordered in response list 832 in the same sequence as the request commands 736 are ordered in the corresponding request list 732. And with the exception of the message request command used for error handling, every request command and response status has the same number of octets. Hence a request frame and the corresponding response frame have the same number of octets assuming all commands have valid opcodes and PHY 516 responds to all request commands.

FIG. 9 shows a request format 902 and a response format 904 for a delay command according to some embodiments of the present invention. Request format 902 includes a delay value. In response to the delay command, PHY 516 waits for an interval specified by the delay value before executing a subsequent command. No device address 748 is required. A delay request command is useful where a pause is required between register accesses. If a delay of 0 is set then there is no delay. The maximum delay is 32.767 seconds. If longer delays are required, multiple delay request commands can be sent back to back. If a much longer delay is required (i.e., minutes or hours) the wait on pattern match request command can be used instead. Because the register access is delayed, the corresponding response frame is also delayed. No response status is generated if the PHY address 746 does not match.

FIG. 10 shows a request format 1002 and a response format 1004 for a wait on pattern match command according to some embodiments of the present invention. Request format 1002 includes a pattern and a register address for a register 532 in PHY 516. In response to the wait on pattern match command, PHY 516 waits until a value in the register 532 matches the pattern before executing a subsequent command. Request format 1002 can also include a delay value. In response, PHY 516 ceases to wait after an interval specified by the delay value.

The wait on pattern match request command is useful where some event has to occur prior to the next register accesses. The value in DEVAD.REGAD is XNOR with Pattern[15:0] and the result is OR with Mask[15:0]. If the resulting value is all 1's then a match occurred. The register is polled at least once per 5 microseconds. The maximum delay interval is 18.2 hours. No response status is generated if the PHY address 746 does not match, or if the device address 748 is not supported.

FIG. 11 shows a request format 1102 and a response format 1104 for a message command according to some embodiments of the present invention. In response to the message command, PHY 516 send a response describing the status of an operation specified by the message command.

The message request command/response status is used for error handling, and is not combined with any other request command other than an end of list request command. If a message request command is seen anywhere else other than the first request command in the request list, it is treated as an invalid opcode, and the request list processing is terminated. No response status is generated if the PHY address 746 does not match. Table 2 shows example actions and corresponding messages for the message command.

TABLE 2

| Action[7:0] | Instruction | Possible Message[7:0] |
|---|---|---|
| 0x00 | Resend | 0x00 = Resend Successful |
| | | 0x01 = Cannot Resend. A request is currently pending but not waiting for a pattern match. |
| | | 0x02 = Cannot Resend. A request is currently pending and is waiting for a pattern match. |
| | | 0x03 = Cannot Resend. A request was never received |
| | | 0x04 = Cannot Resend. Previous request was badly formed. |
| 0x01 | Query | 0x00 = No Requests Pending |
| | | 0x01 = A request is currently pending but not waiting for a pattern match. |
| | | 0x02 = A request is currently pending and is waiting for a pattern match. |
| 0x02 | Abort | 0x00 = Abort Successful |
| | | 0x01 = Nothing To Abort. No Request Pending. |
| Else | reserved | |

Figure 12B:
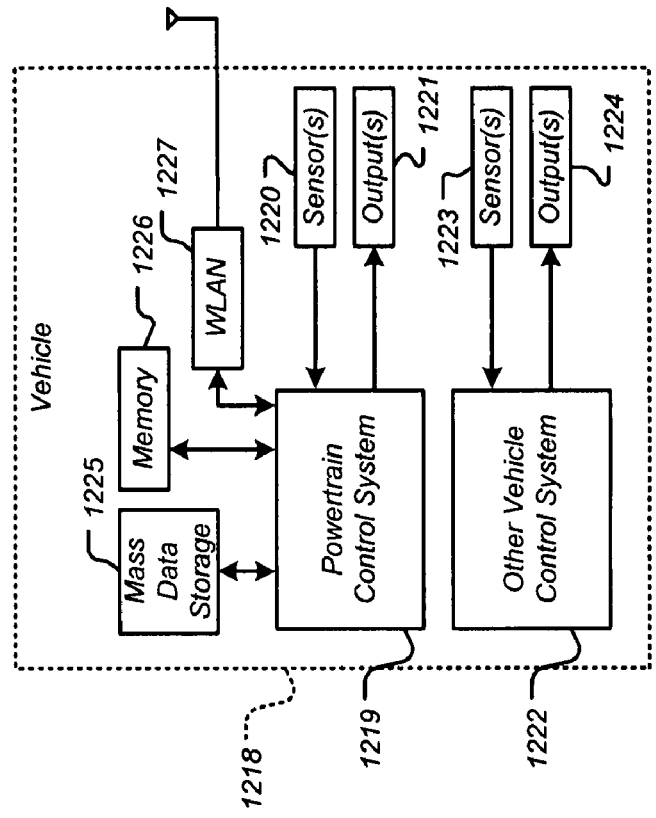
FIGS. 12A-12E show various exemplary implementations of the present invention.
Figure 12A:
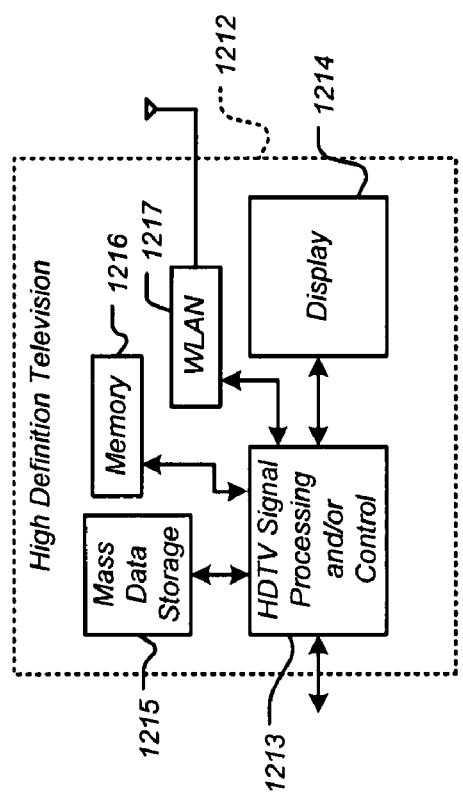

FIGS. 12A-12E show various exemplary implementations of the present invention. Referring now to FIG. 12A, the present invention can be implemented in a high definition television (HDTV) 1212. The present invention may implement either or both signal processing and/or control circuits, which are generally identified in FIG. 12A at 1213, a WLAN interface and/or mass data storage of the HDTV 1212. The HDTV 1212 receives HDTV input signals in either a wired or wireless format and generates HDTV output signals for a display 1214. In some implementations, signal processing circuit and/or control circuit 1213 and/or other circuits (not shown) of the HDTV 1212 may process data, perform coding and/or encryption, perform calculations, format data and/or perform any other type of HDTV processing that may be required.

The HDTV 1212 may communicate with mass data storage 1215 that stores data in a nonvolatile manner such as optical and/or magnetic storage devices. The HDD may be a mini HDD that includes one or more platters having a diameter that is smaller than approximately 1.8". The HDTV 1212 may be connected to memory 1216 such as RAM, ROM, low latency nonvolatile memory such as flash memory and/or other suitable electronic data storage. The HDTV 1212 also may support connections with a WLAN via a WLAN network interface 1217.

Referring now to FIG. 12B, the present invention implements a control system of a vehicle 1218, a WLAN interface and/or mass data storage of the vehicle control system. In some implementations, the present invention implements a powertrain control system 1219 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1222 of the vehicle 1218. The control system 1222 may likewise receive signals from input sensors 1223 and/or output control signals to one or more output devices 1224. In some implementations, the control system 1222 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1219 may communicate with mass data storage 1225 that stores data in a nonvolatile manner. The mass data storage 1225 may include optical and/or magnetic storage devices for example hard disk drives HDD and/or DVDs. The HDD may be a mini HDD that includes one or more platters having a diameter that is smaller than approximately 1.8". The powertrain control system 1219 may be connected to memory 1226 such as RAM, ROM, low latency nonvolatile memory such as flash memory and/or other suitable electronic data storage. The powertrain control system 1219 also may support connections with a WLAN via a WLAN network interface 1227. The control system 1222 may also include mass data storage, memory and/or a WLAN interface (all not shown).

Figure 12C:
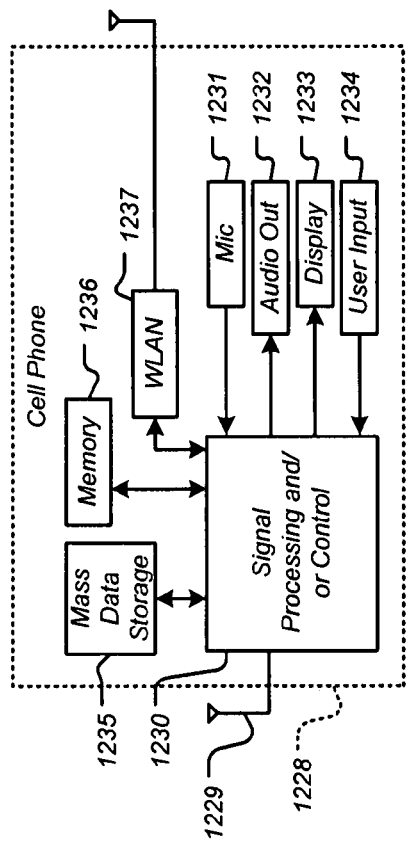

Referring now to FIG. 12C, the present invention can be implemented in a cellular phone 1228 that may include a cellular antenna 1229. The present invention may implement either or both signal processing and/or control circuits, which are generally identified in FIG. 12C at 1230, a WLAN interface and/or mass data storage of the cellular phone 1228. In some implementations, the cellular phone 1228 includes a microphone 1231, an audio output 1232 such as a speaker and/or audio output jack, a display 1233 and/or an input device 1234 such as a keypad, pointing device, voice actuation and/or other input device. The signal processing and/or control circuits 1230 and/or other circuits (not shown) in the cellular phone 1228 may process data, perform coding and/or encryption, perform calculations, format data and/or perform other cellular phone functions.

The cellular phone 1228 may communicate with mass data storage 1235 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1228 may be connected to memory 1236 such as RAM, ROM, low latency nonvolatile memory such as flash memory and/or other suitable electronic data storage. The cellular phone 1228 also may support connections with a WLAN via a WLAN network interface 1237.

Figure 12D:
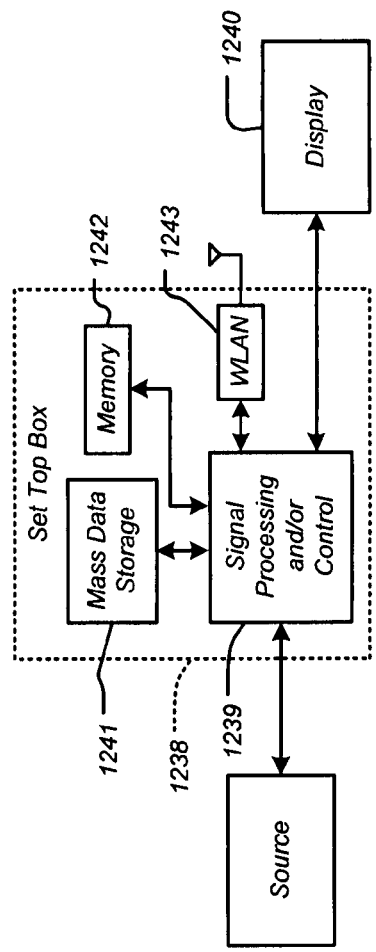

Referring now to FIG. 12D, the present invention can be implemented in a set top box 1238. The present invention may implement either or both signal processing and/or control circuits, which are generally identified in FIG. 12D at 1239, a WLAN interface and/or mass data storage of the set top box 1238. The set top box 1238 receives signals from a source such as a broadband source and outputs standard and/or high definition audio/video signals suitable for a display 1240 such as a television and/or monitor and/or other video and/or audio output devices. The signal processing and/or control circuits 1239 and/or other circuits (not shown) of the set top box 1238 may process data, perform coding and/or encryption, perform calculations, format data and/or perform any other set top box function.

The set top box 1238 may communicate with mass data storage 1243 that stores data in a nonvolatile manner. The mass data storage 1243 may include optical and/or magnetic storage devices for example hard disk drives HDD and/or DVDs. The HDD may be a mini HDD that includes one or more platters having a diameter that is smaller than approximately 1.8". The set top box 1238 may be connected to memory 1242 such as RAM, ROM, low latency nonvolatile memory such as flash memory and/or other suitable electronic data storage. The set top box 1238 also may support connections with a WLAN via a WLAN network interface 1243.

Figure 12E:
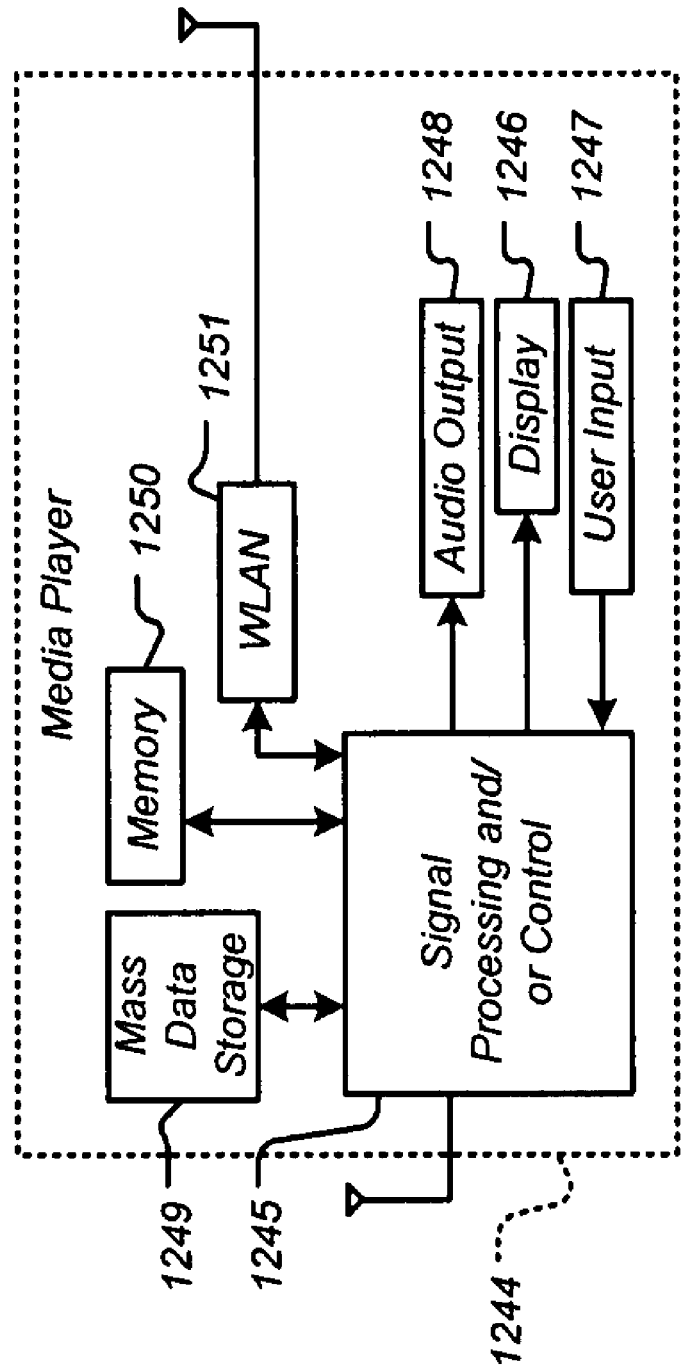

Referring now to FIG. 12E, the present invention can be implemented in a media player 1244. The present invention may implement either or both signal processing and/or control circuits, which are generally identified in FIG. 12E at 1245, a WLAN interface and/or mass data storage of the media player 1244. In some implementations, the media player 1244 includes a display 1246 and/or a user input 1247 such as a keypad, touchpad and the like. In some implementations, the media player 1244 may employ a graphical user interface (GUI) that typically employs menus, drop down menus, icons and/or a point-and-click interface via the display 1246 and/or user input 1247. The media player 1244 further includes an audio output 1248 such as a speaker and/or audio output jack. The signal processing and/or control circuits 1245 and/or other circuits (not shown) of the media player 1244 may process data, perform coding and/or encryption, perform calculations, format data and/or perform any other media player function.

The media player 1244 may communicate with mass data storage 1249 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1244 may be connected to memory 1250 such as RAM, ROM, low latency nonvolatile memory such as flash memory and/or other suitable electronic data storage. The media player 1244 also may support connections with a WLAN via a WLAN network interface 1251. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A port of a network switch, the port comprising:
   an input circuit for receiving a frame for use in managing a physical-layer device (PHY),
   wherein the frame includes:
      a preamble;
      a start frame delimiter for the frame;
      a destination media access control (MAC) address for the frame, wherein the destination MAC address is stored in the PHY;
      a source MAC address for the frame;
      a length/type for the frame, wherein the length/type is stored in the PHY;
      remote management data comprising one or more commands to be executed by the PHY; and
      a frame check sequence for the frame.

2. The port of claim 1, wherein the remote management data further comprises: a sequence number for the frame.

3. The port of claim 1, wherein the remote management data further comprises: a request format for the frame, wherein the request format is stored in the PHY.

4. The port of claim 1, wherein the frame is otherwise compliant with IEEE standard 802.3.

5. The port of claim 1, wherein one of the commands comprises:
   a delay value, wherein the PHY waits for an interval specified by the delay value before executing a subsequent command.

6. The port of claim 1, wherein one of the commands comprises:
   a register address for a register in the PHY; and
   a pattern, wherein the PHY waits until a value in the register matches the pattern before executing a subsequent command.

7. The port of claim 6, wherein the one of the commands further comprises:
   a delay value, wherein the PHY ceases to wait after an interval specified by the delay value.

8. The port of claim 1, wherein one of the commands comprises:
   a message command to cause the PHY to send a response describing status of an operation specified by the message command.

9. A port of a network switch, the port comprising:
   a frame circuit for generating a frame for use in managing a physical-layer device (PHY),
   wherein the frame includes:

a preamble;
a start frame delimiter for the frame;
a destination media access control (MAC) address for the frame;
a source MAC address for the frame;
a length/type for the frame, wherein the length/type is stored in the PHY;
remote management data comprising a response to a command from a management device having the destination MAC address; and
a frame check sequence for the frame.

10. The port of claim 9, wherein the remote management data further comprises: a sequence number for the frame.

11. The port of claim 9, wherein the remote management data further comprises: a request format for the frame, wherein the request format is stored in the PHY.

12. The port of claim 9, wherein the frame is otherwise compliant with IEEE standard 802.3.

* * * * *